United States Patent
Sprangle et al.

(10) Patent No.: US 9,835,761 B2
(45) Date of Patent: Dec. 5, 2017

(54) ACTIVE REMOTE DETECTION OF RADIOACTIVITY BASED ON ELECTROMAGNETIC SIGNATURES

(71) Applicant: Gregory Nusinovich, Bethesda, MD (US)

(72) Inventors: Phillip A. Sprangle, Great Falls, VA (US); Bahman Hafizi, Bethesda, MD (US); Arie Zigler, Arlington, VA (US); Gregory Nusinovich, Bethesda, MD (US); Howard Milchberg, Potomac, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 252 days.

(21) Appl. No.: 14/599,030

(22) Filed: Jan. 16, 2015

(65) Prior Publication Data
US 2016/0377761 A1 Dec. 29, 2016

Related U.S. Application Data

(60) Provisional application No. 61/935,903, filed on Feb. 5, 2014.

(51) Int. Cl.
*G01V 8/00* (2006.01)
*G01T 1/00* (2006.01)
*G01T 7/00* (2006.01)

(52) U.S. Cl.
CPC ............. *G01V 8/005* (2013.01); *G01T 1/00* (2013.01); *G01T 7/00* (2013.01)

(58) Field of Classification Search
CPC ...................................................... G01V 8/005
See application file for complete search history.

(56) References Cited

U.S. PATENT DOCUMENTS

| | | | |
|---|---|---|---|
| 2002/0047543 A1* | 4/2002 | Sugai ............. | H01J 37/32082 315/111.21 |
| 2009/0001889 A1* | 1/2009 | Miles ............. | G01N 27/628 315/111.21 |
| 2012/0170599 A1* | 7/2012 | Sprangle ........ | H01S 3/2237 372/5 |
| 2012/0305773 A1* | 12/2012 | Wu ................ | G01N 21/3581 250/339.07 |

OTHER PUBLICATIONS

P. Sprangle, J. R. Peñano, and B. Hafizi, Propagation of intense short laser pulses in the atmosphere, Phys. Rev. E 66, 046418 (2002).

(Continued)

*Primary Examiner* — David Porta
*Assistant Examiner* — Hugh H Maupin
(74) *Attorney, Agent, or Firm* — US Naval Research Laboratory; William P. Ladd

(57) ABSTRACT

A system for the active remote detection of radioactivity from a target of interest includes a first laser source for generating an ionizing laser beam when remotely directed on a radioactive target of interest, a second laser source for generating a laser probe beam on the radioactive target of interest, and a spectrometer configured to measure the frequency modulation of the probe beam caused by the ionization from the radioactive target of interest.

20 Claims, 4 Drawing Sheets

(56) References Cited

OTHER PUBLICATIONS

P. Sprangle, J. Peñano, B. Hafizi, D. Gordon and M. Scully, Remotely induced atmospheric lasing, Appl. Phys. Lett. 98, 211102 (2011).

R.F. Fernsler, A.W. Ali, J.R. Greig and I.M. Vitkovitsky, "The NRL CHMAIR Code: A Disturbed Sea Level Air Chemistry Code," NRL Memorandum Report 4110 (1979).

A.W. Ali, "Electron Energy Loss Rates in Air," NRL Memorandum Report 5400 (1984).

V.L. Granatstein and G.S. Nusinovich, Detecting excess ionizing radiation by electromagnetic breakdown of air, J. Appl. Phys. 108, 063304 (2010).

G.S. Nusinovich, P. Sprangle, C.R. Talamas and V.L. Granatstein, Range, resolution and power of THz systems for remote detection of concealed radioactive materials, J. Appl. Phys. 109, 083303 (2011).

G.S. Nusinovich, R. Pu, T.M. Antonsen, O.V. Sinitsyn, J. Rodgers, A. Mohamed, J. Silverman, M. Al-Sheikhly, Y.S. Dimant, G.M. Milikh, M.Yu, Glyavin, A.G. Luchinin, E.A. Kopelovich and V.L. Granatstein, Development of THz-range Gyrotrons for Detection of Concealed Radioactive Materials, J. Infrared Milli. Terahz. Waves, 32 380 (2011).

Y.S. Dimant, G.S. Nusinovich, P. Sprangle, J. Peñano, C.A. Romero-Talamas and V.L. Granatstein, Propagation of gamma rays and production of free electrons in air, J. Appl. Phys. 112, 083303 (2012).

\* cited by examiner

ACTIVE REMOTE DETECTION OF RADIOACTIVITY BASED ON ELECTROMAGNETIC SIGNATURES

CROSS-REFERENCE TO RELATED APPLICATIONS

This Application claims the benefit of U.S. Provisional Application 61/935,903 filed on Feb. 5, 2014, incorporated herein by reference.

FIELD OF THE INVENTION

The invention is directed to the detection of radioactive emission sources, and more particularly to determining a radioactive composition of the source by obtaining an electromagnetic signature associated with the specific type of radioactive emission source.

BACKGROUND OF THE INVENTION

Existing methods for detection of radioactive materials have very limited range (less than a few meters). In addition existing methods are passive resulting in limited sensitivity. The Geiger-Muller tube is the most common type of radioactivity detector. A recently proposed active radioactivity detection concept is based on a high power THz pulse inducing avalanche breakdown and spark formation in the vicinity of the radioactive material, but has very limited stand-off detection range.

It would therefore be desirable to remotely detect radioactive materials with greater precision and specificity.

BRIEF SUMMARY OF THE INVENTION

According to the invention, a system for the active remote detection of radioactivity from a target of interest includes a first laser source for generating an ionizing laser beam when remotely directed on a radioactive target of interest, a second laser source for generating a laser probe beam on the radioactive target of interest, and a spectrometer configured to measure the frequency modulation of the probe beam caused by the ionization from the radioactive target of interest.

A laser-based radioactivity detection concept is a significant advance over existing methods and may have unique advantages depending on the stand-off distance and atmospheric conditions. The invention provides the active remote detection of radioactivity from radioactive sources based on their specific activity (radiation level), enabling stand-off detection at distances of greater than 100 m.

BRIEF DESCRIPTION OF THE DRAWINGS

FIG. 5 is a graph showing the fractional frequency shift $\Delta\omega/\omega_o[\%]$ versus time and probe interaction distance L in the presence of radioactive material ($\alpha_{rad}=10^3$) according to the invention with the laser parameters the same as in FIG. 3a.

DETAILED DESCRIPTION OF THE INVENTION

Definition

The term "electromagnetic signature" as used herein means, for example, the identifiable correlation between the modulated laser probe beam and the specific activity (radiation level) attributable to a particular radioactive material, as discussed below.

Figure 1:
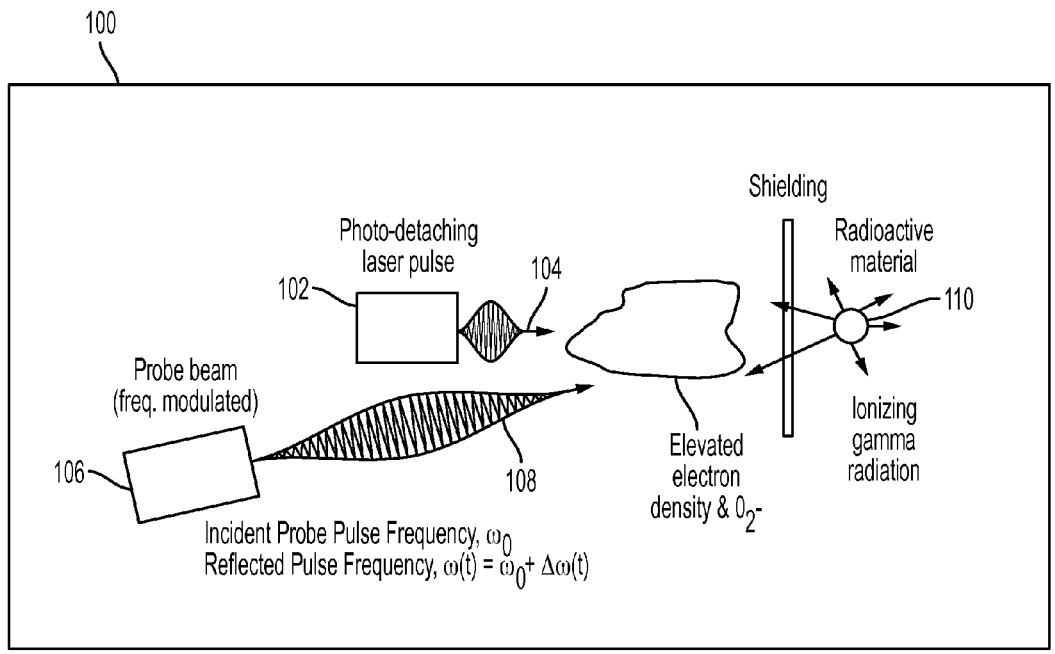
FIG. 1 is a schematic illustration of the active remote radioactivity detection concept according to the invention.

Referring now to FIG. 1 that schematically illustrates the detection concept of the invention, detection system 100 includes an ionizing laser source 102 for generating a photo-detaching and ionizing beam 104 and a second laser source 106 for generating a laser probe beam 108 each from a selected distance onto a target of interest 110. When the target 110 is a radioactive material it emits gamma rays that ionize the surrounding air. The ionized (liberated) electrons rapidly attach to oxygen molecules forming $O_2^-$ ions. The density of $O_2^-$ around radioactive material can be several orders of magnitude greater than background levels. The elevated population of $O_2^-$ extends several meters around the radioactive material. Electrons are easily photo-detached from $O_2^-$ ions by laser radiation. The photo-detached electrons, in the presence of laser radiation, initiate avalanche ionization which results in a rapid increase in electron density. The rise in electron density induces a frequency modulation on a probe beam that correlates to and identifies the particular radioactive material based on its unique specific activity, thereby providing an electromagnetic signature.

The detector: A spectrometer, capable of detecting frequencies in the range of +/−10% of the frequency of the probe laser beam.

The selection of the distance of lasers 102 and 106 from the target 110 may be based on a number of factors such as prevailing atmospheric conditions.

Propagation of high power short pulse lasers in the atmosphere over extended distances has been analyzed and experimentally characterized, e.g. as described in P. Sprangle, J. R. Peñano, and B. Hafizi, Phys. Rev. E 66, 046418 (2002). Since the negative ions produced by the radioactive material have a low ionization potential (0.46 eV) they can be photo-detached by laser radiation (~0.8-1 μm). The invention's approach is based on the probe beam 108 undergoing a frequency modulation while propagating in a temporally increasing electron density. The frequency modulation on the probe beam 108 becomes a spectral signature for the presence of radioactive material.

Radiation Enhancement Factor

A gamma ray propagating through matter can interact through several processes, including Rayleigh scattering, photoelectric and Compton effects, pair production, and so forth. In air, photoelectric absorption dominates at low photon energies (<25 keV) while at high energies (~25 keV-3 MeV) Compton processes dominate. As the gamma ray propagates in air it loses energy in a cascading process and its mean free path $L_\gamma$ decreases. A 1 MeV gamma ray has a mean free path in air of $L_\gamma \approx 130$ m.

The ionization rate due to background (ambient) radio-activity is $(dN_e/dt)_{amb} = Q_{rad}$. At or near ground level, the background ionization rate is typically in the range $Q_{rad} \sim 10\text{-}30$ pairs/(cm$^3$-sec). The gamma rays emitted by radioactive material ionize the surrounding air. In the presence of radioactive material the ionization rate (due to only radiation) can be greatly enhanced by a factor $\alpha_{rad} \gg 1$ and $(dN_e/dt)_{rad} \alpha_{rad} Q_{rad}$. For a radioactive material of mass $M_{rad}$ the number of disintegrations per second is $v_{rad} = M_{rad} A_{rad}$, where $A_{rad}$ is the specific activity associated with the material. For example, for $^{60}$Co, $A_{rad} = 1.1 \times 10^3$ Ci/g=$4.1 \times 10^{13}$ disintegration/(g-sec). In the case of $^{60}$Co each disintegration results in two gammas of energy $E_{\gamma,max} = 1.173$ MeV and $E_{\gamma,max} = 1.332$ MeV which have a range in air of ~130 m. In air the high energy gammas generate high energy electrons, via Compton and photoelectric processes, which undergo a cascading process to sufficiently low energy to attach to $O_2$ molecules forming $O_2^-$ ions. In the cascading process the electrons lose an amount of energy $\Delta E \approx 34$ eV per collision in air which results in both ionization and electronic excitation. A high energy electron with energy $E_e$ therefore generates $\sim E_e/\Delta E$ low energy electrons. An electron having an energy of 1 MeV has a range in air of 4.6 m.

Figure 2:
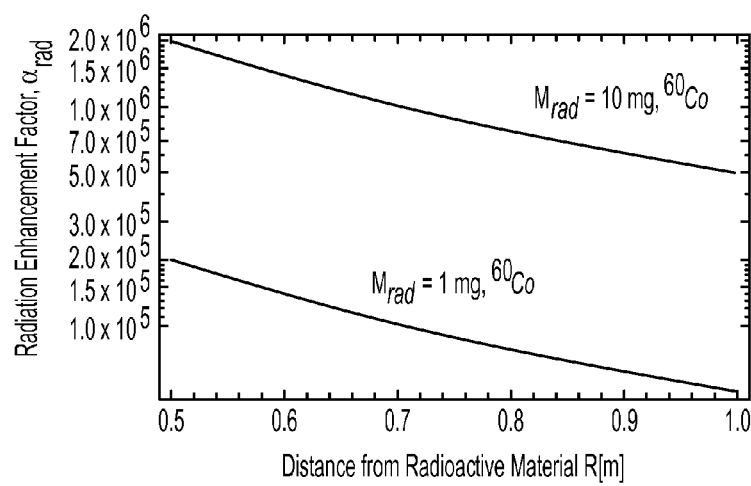
FIG. 2 is a graph showing the radiation enhancement factor plotted as a function of distance from the radioactive source for 1 mg and 10 mg of $^{60}$Co according to the invention.

For a small spherical source of radioactivity the steady state density of emitted gamma rays is $N_\gamma = (v_{rad}\kappa_\gamma/4\pi c R^2)\exp(-R/L_\gamma)$ where R is the distance from the radioactive material, $L_\gamma$ is the effective range (mean free path) of the gamma rays in air which is a function of the gamma ray energy, $E_\gamma$, and $\kappa_\gamma$ is the number of gammas emitted per disintegration. The rate of change of electron density is a $\partial N_e/\partial t \approx (\alpha_{rad}+1) Q_{rad}+$air chemistry and ionization terms, where $$\alpha_{rad} \approx c\langle\sigma_{\gamma-e}\rangle N_{air} N_\gamma \frac{\langle E_e\rangle}{\Delta E} \frac{1}{Q_{rad}} \approx \frac{v_{rad}\kappa_\gamma}{4\pi\langle L_{\gamma-e}\rangle} \frac{\langle E_e\rangle}{\Delta E} \frac{1}{Q_{rad}} \frac{\exp(-R/L_\gamma)}{R^2},$$

is the radiation enhancement factor, $\langle E_e \rangle$ is the average electron energy, $\langle \sigma_{\gamma-e}\rangle$ is the effective average cross section for electron generation by gammas, i.e., Compton absorption and photoelectric processes, $\langle L_{\gamma-e}\rangle = (\langle\sigma_{\gamma-e}\rangle N_{air})^{-1}$ is the average mean free path for electron generation by gammas and $N_{air} = 2.7 \times 10^{19}$ cm$^{-3}$ is the air density at STP. In the absence of radioactive material $\alpha_{rad}=0$. In FIG. 2 the radiation enhancement factor $\alpha_{rad}$ is plotted as a function of the distance from the radioactive source R. This plot is for samples containing 1 mg and 10 mg of $^{60}$Co and indicates that the enhanced level is significant for ranges extending up to several meters. As an example, for $\langle E_e\rangle=0.5$ MeV, $M_{rad}=10$ mg, $v_{rad}=M_{rad}A_{rad}=8.2\times10^{11}$ disintegrations/sec, $\kappa_\gamma=2$, R=50 cm, $\langle L_{\gamma-e}\rangle=100$ m and $Q_{rad}=20$ disintegrations/(cm$^3$-sec) the radiation enhancement factor is $\alpha_{rad} \approx 2 \times 10^6$ which is far above the background level.

Electron and Ion Density Evolution (Air Chemistry)

To determine the frequency modulation on a probe pulse it is necessary to follow the time evolution of the electron and negative ion density, which are sensitive functions of air chemistry processes (see, e.g., M. Capitelli, C. M. Ferreira, B. F. Gordiets and A. I. Osipov, *Plasma Kinetics in Atmospheric Gases* (Springer-Verlag, NY 2010)) and electron heating by the laser radiation. The source terms for the electrons include radioactivity, detachment, photo-detachment and photo-ionization, while the loss terms include various attachment and recombination processes including aerosols. The expressions for the rate of change of electron density $N_E$ and negative ion density $N_-$ (see, e.g., R. F. Fernsler, A. W. Ali, J. R. Greig and I. M. Vitkovitsky, "The NRL CHMAIR Code: A Disturbed Sea Level Air Chemistry Code," NRL Memorandum Report 4110 (1979); A. W. Ali, "Electron Energy Loss Rates in Air," NRL Memorandum Report 5400 (1984); L. G. Christophorou, *Atomic and Molecular Radiation Physics* (Wiley-Interscience, London, UK, 1971), p. 530; P. Sprangle, J. Peñano, B. Hafizi, D. Gordon and M. Scully, Appl. Phys. Lett. 98, 211102 (2011)) are $$\partial N_e/\partial t = (1+\alpha_{rad})Q_{rad}+S_e-L_e, \ \partial N_-/\partial t = S_- - L_-,$$

where $S_e$ represents the various electron source terms, $L_e$ is the electron loss terms, $S_-$ represents the ion source, $L_-$ is the ion loss terms (see, e.g., P. Sprangle, B. Hafizi, H. Milchberg, G. Nusinovich and A. Zigler, Physics of Plasmas (to be published, 2013)).

The effect of radioactivity is represented by the first term on the right hand side of the electron rate equation. The steady state electron and negative ion densities are given by $$N_e \approx (\beta_n N_n/\eta) \sqrt{(1+\alpha_{rad})Q_{rad}/\beta_+} + (1+\alpha_{rad})Q_{rad}/\eta \approx (\beta_n N_n/\eta)\sqrt{(1+\alpha_{rad})Q_{rad}/\beta_+}, \text{ and } N_- \approx \sqrt{(1+\alpha_{rad})Q_{rad}/\beta_+},$$

where $N_n$ is the neutral air density ($N_n \sim N_{air}$ for low levels of ionization), $\beta_+ \approx 2\times10^{-6}$ cm$^3$/sec is the recombination rate, $\eta \approx 10^8$ sec$^{-1}$ is the attachment rate and $\beta_n \approx (5-10)\times10^{-19}$ cm$^3$/sec is the negative ion detachment rate due to collisions with neutrals. In the absence of radioactive material ($\alpha_{rad}=0$) the ambient (background) electron and negative ion density are $N_e 10^{-3}$ cm$^{-3}$ and $N_- \approx 3\times10^3$ cm$^{-3}$, where $Q_{rad}=20$ cm$^{-3}$ sec$^{-1}$. At a distance of 4 m from a radioactive source containing 10 mg of $^{60}$Co, the radioactive enhancement factor is $\alpha_{rad}=2.2\times10^4$ and the elevated electron and negative ion densities are $N_e 0.2$ cm$^{-3}$ and $N_- \approx 4.7\times10^5$ cm$^{-3}$.

The ionization potential of $O_2^-$ is 0.46 eV and therefore can undergo single-photon photo-detachment with laser radiation of wavelength $\lambda=1$ µm (1.24 eV) or $\lambda=0.8$ µm (1.55 eV). The photo-detachment rate is $v_{opt}=\sigma_{opt}cN_{ph}=\sigma_{opt}I_o/\hbar\omega$, where $cN_{ph}=I_o/\hbar\omega$ is the incident photon flux, $I_o$ is the laser intensity and $\sigma_{opt}$ is the photo-detachment cross section. The experimental value for the single-photon ionization cross section of $O_2^-$ is $\sigma_{opt}(\lambda=1$ µm$) \approx 4.5\times10^{-19}$ cm$^2$ and $\sigma_{opt}(\lambda=0.8$ µm$) \approx 7.5\times10^{-19}$ cm$^2$. The single-photon ionization rate for $O_2^-$ is therefore, $$v_{opt}[\text{sec}^{-1}] = I_o[\text{W/cm}^2]\begin{cases} 2.3, & \lambda=1\,\mu\text{m} \\ 3, & \lambda=0.8\,\mu\text{m} \end{cases},$$

The various source and loss terms, in particular the collisional ionization rate, are functions of the electron temperature. The electron temperature is determined by the collisional electron heating (Ohmic heating) by the laser radiation and the cooling effect resulting from excitation of vibrational modes of the air molecules. The equation for the electron temperature $T_e$ (see, e.g., Ya. B. Zel'dovich and Yu. P. Raizer, *Physics of Shock Waves and High-Temperature Hydrodynamic Phenomena* (Dover, Mineola, N.Y., 2002)), $$(3/2)\partial(N_e T_e)/\partial t = \langle J\cdot E\rangle + (3/2)(N_e/\tau_{cool})(T_e-T_{eo}) - U_{ion}\partial N_e/\partial t,$$

where $T_e$ is the electron temperature, $\langle J\cdot E\rangle$ is the Ohmic heating rate, $\tau_{cool}$ is the electron cooling time due to inelastic collisions, $T_{eo}=0.025$ eV is the ambient electron temperature and $U_{ion}$ is the effective ionization potential of air (~10 eV).

Frequency Modulation on a Probe Beam

A probe beam propagating through a region of space in which the electron density is changing with time will undergo a frequency change. The electron density in the vicinity of the radioactive source and under the influence of the laser radiation varies in space and in time. Consequently the frequency/wavenumber of an electromagnetic probe beam propagating in such a plasma will vary in space and in time. The one-dimensional wave equation $(\partial^2/\partial z^2 - c^{-2}\partial^2/\partial t^2)A(z,t) = c^{-2}\omega_p^2(z,t)A(z,t)$ can be used to determine the frequency/wavenumber shift. Here, $\omega_p(z,t) = (4\pi q^2 N_e(z,t)/m)^{1/2}$ is the plasma frequency and $A(z,t)$ is the vector potential associated with the probe. The vector potential can be expressed in terms of slowly-varying amplitude and phase, in the form $A(z,t) = (\frac{1}{2})B(z,t)\exp[i(k_o z - \omega_o t) + \theta(z,t)] + $ c.c., where $\omega_o$ is the incident probe frequency and $\theta(z,t)$ is the phase. The frequency modulation on the probe beam is given by $\omega_{probe}(z,t) = \omega_o + \Delta\omega(z,t)$, where $\Delta\omega(z,t) = \omega_{po}^2/(2\omega_o)\exp(v_{ion}t)(1-\exp(-v_{ion}z/c))$ and $v_{ion}$ is the ionization frequency. The maximum fractional frequency shift occurs for $z \gg c/v_{ion} \sim 1$ cm and is $\Delta\omega_{max}/\omega_o = (\omega_{po}^2/2\omega_o^2)\exp(v_{ion}t)$. The effective ionization rate can vary widely but is typically $v_{ion} \sim 10^{11}$ sec$^{-1}$.

Radioactivity Detection Example

Figure 3A:
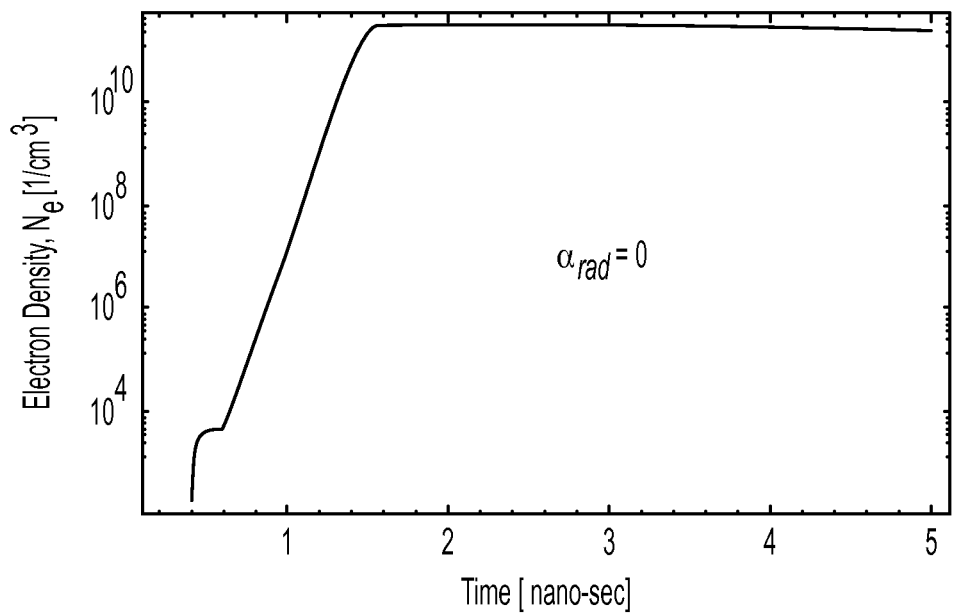
FIG. 3A is a graph showing electron density as a function of time in the absence of any external radioactivity, where the laser parameters are $\lambda=1$ μm, $I_{peak}=160$ GW/cm$^2$, $\tau_{laser}=1$ nsec
Figure 3B:
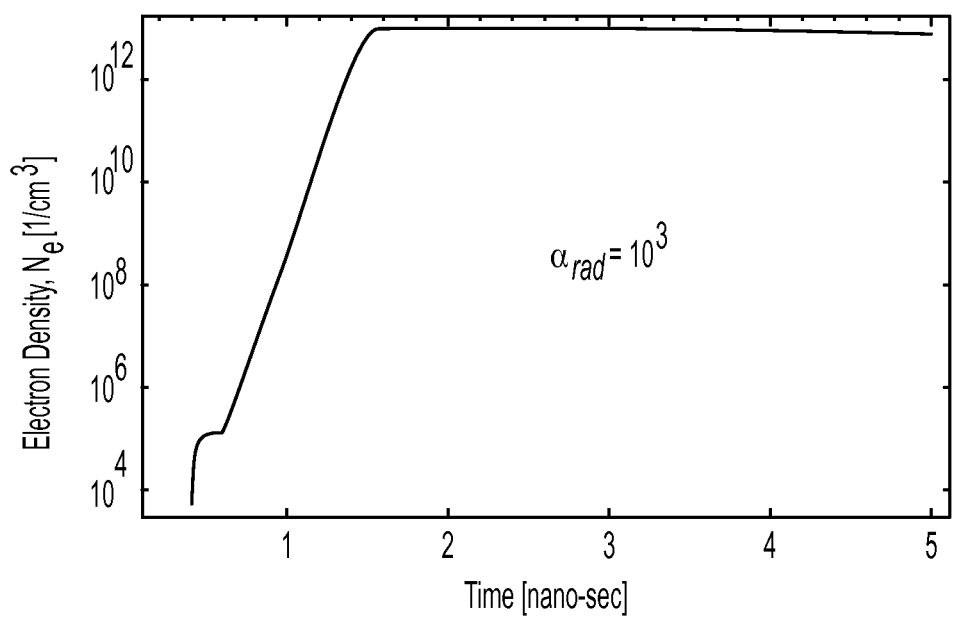
FIG. 3B is a graph showing electron density versus time in the presence of radioactivity, with the same laser parameters as in FIG. 3A, according to the invention.

The radioactive source is assumed strong enough to produce a radiation enhancement factor of $\alpha_{rad} = 10^3$. The radiation enhancement factor value is consistent with low quantities of radioactive material as shown in FIG. 2. We take the ionizing laser to have a peak intensity of $I_{peak} = 160$ GW/cm$^2$ and pulse duration of $\tau_{laser} = 1$ nsec. In these examples, the probe beam is taken to be a millimeter wave source of frequency $f_{probe} = 94$ GHz, ($\lambda_{probe} = 3.2$ mm). The critical electron density, associated with the probe frequency, $\omega_{probe} = \omega_{p,crit} = 5.64 \times 10^4 n_{e,crit}^{1/2}$[cm$^{-3}$], is $n_{e,crit} = 10^{14}$ cm$^{-3}$. The background radiation is taken to be $Q_{rad} = 30$ disintegrations/(cm$^3$-sec) In the absence of radioactivity, FIG. 3A, the ionizing laser intensity is just below the breakdown level, i.e., the electron density is low, and there is virtually no frequency modulation on the probe beam. FIG. 3B shows the electron density as a function of time in the presence of radioactive material ($\alpha_{rad} = 10^3$). The electron density at the end of the ionizing laser pulse approaches the value of $n_e = 10^{13}$ cm$^{-3}$ which is an order of magnitude less than the critical electron density.

Figure 4:
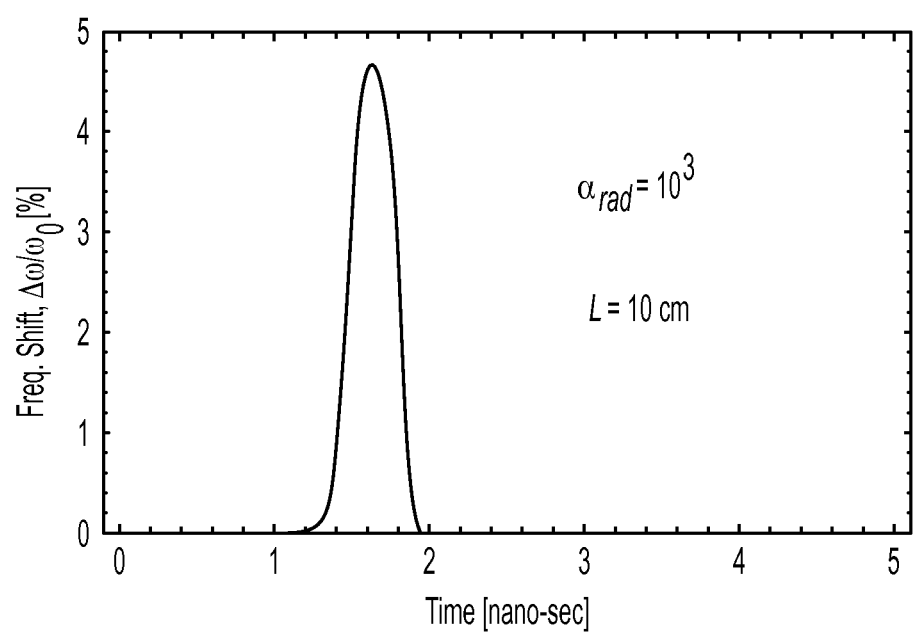
FIG. 4 is a graph showing the fractional frequency shift $\Delta\omega/\omega_o[\%]$ versus time in the presence of radioactive material $\alpha_{rad}=10^3$ at the probe interaction distance of L=10 cm, with the same laser parameters as in FIG. 3A, according to the invention.
Figure 5:
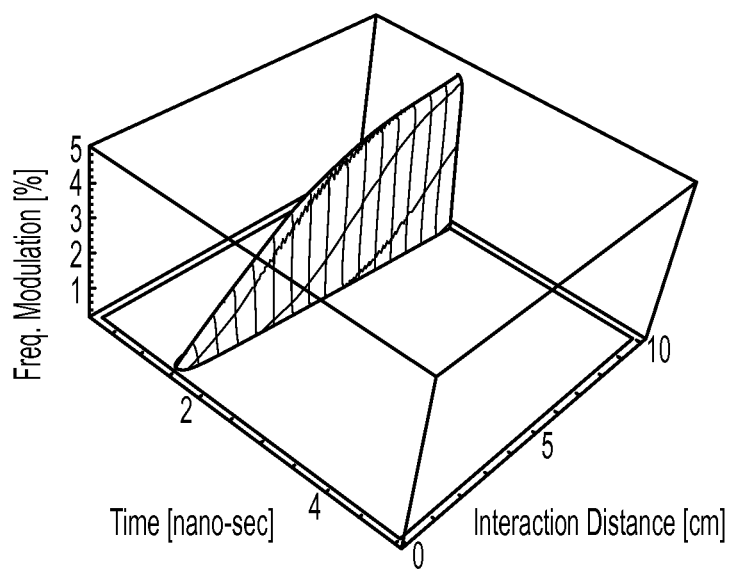

The frequency modulation on the probe millimeter wave beam is shown in FIG. 4. In the absence of radioactive material there is no frequency modulation on the probe. However, for $\alpha_{rad} = 10^3$ the fractional frequency modulation is significant and equal to ~5%, which is readily detectable. The fractional frequency shift on the probe as a function of both axial interaction distance L and time is shown in FIG. 5.

While the present invention has been described with respect to exemplary embodiments thereof, it will be understood by those of ordinary skill in the art that variations and modifications can be effected within the scope and spirit of the invention. For example, the probe laser can comprise a probe millimeter wave source or a microwave source. Also, the presence of an ionizing radioactive material may further be detected by the generation of a spark/air breakdown upon ionization when exposed to the ionizing laser beam. In addition, the invention may be applied to/include spectroscopic signatures from other species present in the atmosphere such as the 337 nm line of nitrogen molecules. Alternatives electromagnetic signatures include i) backscattering and frequency upshifting of radiation from energetic electrons generated by the gamma rays, ii) spectroscopic signature from other molecular constituents in the atmosphere that are excited by the gamma rays and iii) photo-detachment of electrons from atomic oxygen, O$^-$.

What is claimed as new and desired to be protected by Letters Patent of the United States is:

1. A method for active remote detection of radioactivity from a radioactive target of interest that emits radiation causing ions to form in air surrounding the radioactive target of interest, the method comprising:
   generating a laser beam using a first laser source, wherein the laser beam is configured to photo-detach the ions formed by the radioactive target of interest;
   generating a laser probe beam using a second laser source;
   directing the laser beam and the laser probe beam onto the radioactive target of interest;
   measuring, based on a time evolution of electron density near the radioactive target of interest, a frequency modulation of the laser probe beam;
   determining, based on the frequency modulation, an electromagnetic signature of the radioactive target of interest; and
   identifying, based on the electromagnetic signature, a type of radioactive material in the radioactive target of interest.

2. The method of claim 1, wherein the first laser source has a peak intensity of $I_{peak} = 160$ GW/cm$^2$ and a pulse duration of $\tau_{laser} = 1$ nsec.

3. The method of claim 1, wherein the laser probe beam has a frequency in the range of 90 GHz to 110 GHz.

4. The method of claim 1, wherein identifying the type of radioactive material in the radioactive target of interest further comprises:
   detecting a generation of a spark/air breakdown initiated by the laser beam.

5. The method of claim 1, wherein the laser beam initiates an avalanche ionization in air surrounding the radioactive target of interest.

6. The method of claim 5, wherein the avalanche ionization initiates an increase in electron density in the air surrounding the radioactive target of interest.

7. The method of claim 6, wherein the increase in electron density induces the frequency modulation.

8. The method of claim 1, wherein the measured frequency modulation corresponds to an increase in the electron density over time.

9. A system for the active remote detection of radioactivity from a radioactive target of interest, the system comprising:
   a first laser source configured to generate a laser beam, wherein the laser beam is configured to photo-detach ions formed by the radioactive target of interest;
   a second laser source configured to generate a laser probe beam directed on the radioactive target of interest; and
   a spectrometer configured to measure, based on a time evolution of electron density near the radioactive target of interest, a frequency modulation of the laser probe beam caused by an increase in the electron density, initiated by the laser beam, in air surrounding the radioactive target of interest.

10. The system of claim 9, wherein a radioactive composition of the radioactive target of interest is determined by:
   measuring a frequency modulation of the laser probe beam, determining, based on the frequency modulation, an electromagnetic signature of the radioactive target of interest, and identifying, based on the electromagnetic signature, the radioactive target of interest as having a specific type of radioactive material.

11. The system of claim 9, wherein the first laser source has a peak intensity of $I_{peak}=160$ GW/cm$^2$ and a pulse duration of $\tau_{laser}=1$ nsec.

12. The system of claim 9, wherein the laser probe beam has a frequency in the range of 90 GHz to 110 GHz.

13. The system of claim 9, wherein the laser beam is configured to initiate an avalanche ionization in the air surrounding the radioactive target of interest.

14. The system of claim 13, wherein the avalanche ionization initiates the increase in electron density.

15. The system of claim 14, wherein the frequency modulation of the laser probe beam correlates to a type of radioactive material.

16. The system of claim 9, wherein the spectrometer is configured to detect frequencies in the range of +/−10% of a frequency of the laser probe beam.

17. The system of claim 9, wherein the spectrometer is further configured to:

detect a generation of a spark/air breakdown initiated by the laser beam.

18. A system for the active remote detection of radioactivity from a radioactive source that emits gamma rays causing $O_2^-$ ions to form in air surrounding the radioactive source, the system comprising:

a first laser source configured to generate a laser beam, wherein the laser beam has a peak intensity and a pulse duration sufficient to photo-detach electrons from the $O_2^-$ ions and initiate avalanche ionization in air surrounding the radioactive source when the laser beam is directed on the radioactive source from a selected distance;

a second laser source configured to generate a laser probe beam modulated by the avalanche ionization; and a spectrometer configured to measure, based on a time evolution of electron density near the radioactive target of interest, a frequency modulation of the laser probe beam caused by the avalanche ionization.

19. The system of claim 18, wherein a radioactive composition of the radioactive source is determined by:

measuring a frequency modulation of the laser probe beam, determining, based on the frequency modulation, an electromagnetic signature of the radioactive source, and identifying, based on the electromagnetic signature, the radioactive source as having a specific type of radioactive material.

20. The system of claim 19, wherein the first laser source has a peak intensity of $I_{peak}=160$ GW/cm$^2$ and a pulse duration of $\tau_{laser}=1$ sec.

* * * * *